United States Patent [19]
Parodi et al.

[11] Patent Number: 5,233,013
[45] Date of Patent: Aug. 3, 1993

[54] THERMOTROPIC LIQUID-CRYSTALLINE AROMATIC COPLYMERS

[75] Inventors: Fabrizio Parodi; Angelo Nora, both of Genoa, Italy

[73] Assignee: Enichem S.p.A., Milan, Italy

[21] Appl. No.: 920,126

[22] Filed: Jul. 24, 1992

Related U.S. Application Data

[60] Division of Ser. No. 752,948, Aug. 26, 1991, Pat. No. 5,155,204, which is a continuation of Ser. No. 454,683, Dec. 21, 1989, abandoned.

[30] Foreign Application Priority Data

Dec. 23, 1988 [IT] Italy .................. 23089 A/88

[51] Int. Cl.⁵ ............... C08G 63/00; C08G 63/02
[52] U.S. Cl. .................. 528/183; 528/176; 528/184; 528/190; 528/193; 528/194
[58] Field of Search ............ 528/176, 183, 184, 190, 528/193, 194

[56] References Cited

PUBLICATIONS

Jung-Il Jin et al. "Synth. of Coplyesters . . . Having Ordered Monomer Sequence," Macromolecules 1989, 22, 4402–4408.

Primary Examiner—John Kight, III
Assistant Examiner—T. Mosley
Attorney, Agent, or Firm—Hedman, Gibson & Costigan

[57] ABSTRACT

Liquid-crystalline, completely aromatic copolyesters are disclosed, which are endowed with a heat stability not lower than 350° C., and are constituted by a succession of repeatitive units containing:

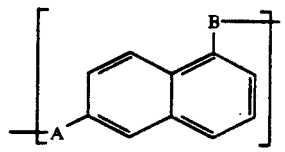

wherein A and B, which can be either equal to, or different, from, each other, can be either —O— or —CO— and one of the following moieties:

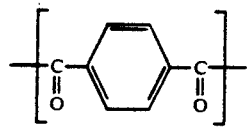

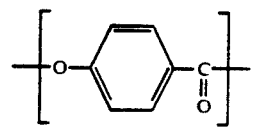

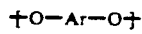

in which Ar can be 1,4-phenylene, 2-monosubstituted-1,4-phenylene or 4,4'-diphenylene.

Also copolyesters also containing amidic bonding groups are disclosed.

3 Claims, No Drawings

THERMOTROPIC LIQUID-CRYSTALLINE AROMATIC COPLYMERS

This is a divisional of application Ser. No. 07/752,948, filed Aug. 26, 1991, now U.S. Pat. No. 5,155,204, which in turn is a continuation of application Ser. No. 07/454,683, filed Dec. 21, 1989, now abandoned.

The present invention relates to completely aromatic copolyesters optionally containing also bonding groups of amidic character, which are endowed with thermotropic Liquid-crystalline characteristics, and to the relevant preparation processes.

Polymers semi-crystalline in the solid state and capable of originating, in the molten state or in solution, fluids endowed with liquid-crystalline properties, i.e., with intermediate characteristics and behaviour between those of an isotropic, high-viscosity liquid and those of a crystalline solid, have been long known.

In other terms, the liquid-crystalline polymeric fluids display characteristics of anisotropy—in general typical of the crystalline solids by virtue of ordered molecular structures existing in the interior of their mass—and, at the same time, they show the mobility of the viscous liquids. The possession and the type of liquid-crystalline characteristics of a polymer are determined by its chemical structure.

Two important categories of liquid-crystalline polymers are known: the lyotropic polymers, which are capable of originating anisotropic fluid phases in their state as solutions, and the thermotropic polymers, capable of originating anisotropic fluid phases in the molten state. Differently from the isotropic polymeric fluids, from the solutions of conventional polymers, or from the molten phases from traditional polymers, the liquid-crystalline polymeric fluids show a marked trend to assume an ordered and orientated configuration under the effect of slip stresses of even small value.

When they are solidified under flowing conditions, the liquid-crystalline polymeric fluids can originate highly crystalline solid phases with a fibrillar morphology strongly characterized by the alignment and the orientation of their fibrils according to the same flowing direction. It is well known that such materials with fibrillar structure are characterized, in the direction(s) of prevailing orientation of the same fibrous structure, by physical-mechanical properties, which are at all unusual for the traditional polymeric materials, and are highly useful for several practical applications. Such properties are represented by particularly high values of elastic modulus and tenacity, as well as by very reduced values of coefficient of thermal expansion.

In particular, the thermotropic liquid-crystalline polymers constitute a category of materials, for which the field of their already established applications, as well as of their potential applications at an industrial level is of considerable and increasing interest, both thanks to the end properties which can be achieved in articles manufactured from them, and by virtue of their direct processability in the molten state, similarly to other conventional thermoplastic polymers.

The solidification and crystallization of the molten, thermotropic liquid-crystalline polymer phases under flowing conditions is a necessary condition for the formation to take place inside them of orientated fibrillar structures, and for articles showing high physical-mechanical properties to be eventually obtained from them. From a general viewpoint, for that purpose those processes can be used, and are suitable, which are presently used in the industrial practice for the fabrication of the conventional amorphous or semicrystalline thermoplastic polymers, and which cause, or can promote, the solidification of a polymeric molten phase under a whatever flowing condition.

Known and suitable processes are, in particular:

a) the forced emission of a polymeric molten phase through nozzles, followed by the stretching of the resulting semi-fluid filaments, with filaments or fibres being obtained according to methods customarily adopted in the manufacture of synthetic fibres;

b) extrusion of a polymeric molten phase through nozzles of various outlines and cross-section surface-areas, with rods, bars, structural shapes, sheets or plates being obtained;

c) pressure-filling, with a polymeric molten phase, of the hollow of the mould, of various shapes and sizes, of an injection-press;

d) hot-compression of polymeric powders or granules in a press, a process which causes the material to flow in various directions, and prevailingly in directions perpendicular to the direction of compression.

By means of such fabrication processes, various types of articles can be manufactured from a thermotropic polymeric raw material, and namely, in particular, according to the description of the same processes, fibres, rods, bars, structural shapes, sheets, plates, as well as articles of various, even complex, shapes, can be obtained.

Such processes are cited for exemplifying purposes, owing to their particular importance at the industrial level, but variants thereof, as well as other industrial processes, not expressly reported herein, can be used and are known to those skilled in the art of the technologies of fabrication of the conventional thermoplastic polymers.

It is known at present that the crystalline fibrils which can be generated inside the mass of the thermotropic polymers when their liquid-crystalline molten phase is solidified under flowing conditions, have an influence on the mechanical-physical properties of the material, by acting similarly to high-elastic-modulus reinforcer fibres, such as fiberglass, carbon fibres, and still other, fibres, introduced from the outside into a conventional thermoplastic polymer by disperding and compounding said fibres into the molten polymer by means of processes, and with effects of mechanical reinforcement, which are well known to those skilled in the art of the composite thermoplastic materials of conventional type.

The present Applicant was able to observe, during experimental tests, that the crystalline fibrils generated inside the mass of some thermotropic polymers, and aligned and orientated inside them according to the direction(s) of flux of the liquid-crystalline molten phase, can improve the physical-mechanical properties of the polymeric material in the same flux direction(s), with the elastic modulus and the tenacity values being increased, and the coefficient of thermal expansion being lowered, analogously to, and at levels equivalent to, or higher than, as it occurs when reinforcer fiberglass or carbon fibres are compounded in conventional thermoplastic polymers and are similarly orientated by means of processing steps under flowing conditions.

Therefore, from a general point of view, the thermotropic liquid-crystalline polymers can be proposed, and some of them have actually been introduced on the market, as self-reinforced thermoplastic polymeric materials endowed with particular advantages over the conventional thermoplastic composites containing reinforcer fiberglass or carbon fibres.

Some of such relative advantages which can be found out are:

(a) Low viscosity values in the molten state, with low processing power consumption and with higher versatility of use;

(b) absence of abrasive processes, which are exerted on the contrary, and in particular by a fiberglass reinforcing agent, to the damage of the processing machinery, with the relevant maintenance and replacement costs being consequently reduced;

(c) the same processes of compounding with fibres are no longer necessary, with power saving and decrease of the costs of installation of the necessary equipment for the preselected processing cycle.

The thermotropic polymers can be processed in the liquid-crystalline molten state, which is the necessary condition for the formation to be possible inside them of fibrillar structures which can be orientated with a self-reinforcer effect, only if some of their features—which features are entirely depending on their chemical structure—meet well precise requirements.

The thermotropic liquid-crystalline polymers useable as self-reinforced polymeric materials should desirably be endowed with a good thermal stability, and they should be characterized by a temperature of incipient thermal breakdown as higher as possible than their melting point which, in case of these polymers, constitutes the temperature of transition from their solid crystalline state to the liquid-crystalline molten phase. Inversely, on the contrary, such polymers should have a melting point as lower as possible than their thermal breakdown temperature.

Another desirable feature these polymers should be endowed with, is a value of temperature of turning into isotropic, i.e., of the temperature of transition from a liquid-crystalline molten phase to a conventional, isotropic molten phase, as higher as possible than their melting point. The temperature range from the melting point of the polymer up to the temperature of incipient thermal breakdown thereof (at which the polymeric material starts to undergo thermal degradation), or the temperature range from the melting point of the polymer up to the temperature at which said polymer turns into isotropic (i.e., the temperature at which the molten phase loses its liquid-crystalline properties—orientation ability under flowing conditions and orientated crystallizability of fibrils), constitutes the temperature range within which each thermotropic polymer can be actually processed in the molten state, and within which its potential and high physical-mechanical properties can be achieved. The wider such a temperature range, the more widely the processing conditions can be varied as a function of the specific requirements the fabrication process and the end products should meet, and the less critic are the requirements of temperature adjustment and temperature control in the various steps of the same fabrication processes.

Besides being used as self-reinforced thermoplastic polymers, the thermotropic liquid-crystalline polymers can be used as reinforcer materials for conventional thermplastic polymers. In other terms, the formation of orientated crystalline fibrillar structures can generally take place also inside thermoplastic materials of conventional type with which the same thermotropic polymers are blended, with effects of reinforcement being showed, which are analogous to those obtained when fibreglass or carbon fibres are compounded into the corresponding traditional composites. In this case too, the same fabrication processes as hereinabove listed should, or can, be used, by means of which the solidification of the molten thermoplastic material takes place under flowing conditions, i.e., once more, melt-spinning, extrusion, injection-moulding, and still other processes, by means of which different types of articles can be manufactured from different thermoplastic polymeric materials containing a reinforcer polymer of thermotropic liquid-crystalline character.

The advantages which can be found out for such particular composite materials as compared to the traditional composites, are the same as already pointed out hereinabove for the thermotropic liquid-crystalline polymers used as self-reinforced thermoplastic materials.

The specific requisites the characteristics of thermotropic liquid-crystalline polymers should suitably comply with, in order to be suitable for being used as reinforcer agents are, in particular, besides those as already seen for them to be used as self-reinforced thermoplastic materials, the following:

(a) a range of temperatures of processability in the state of liquid-crystalline molten phase comprised within, or wider than, the range of temperatures of processing in the molten state of the various conventional thermoplastic polymers to be reinforced, such as the aliphatic polyamides, polyethylene-terephthalate, polybutene-terephthalate, poly(bisphenol A-carbonate), polyether-sulfones, polyetherimides, and still others;

(b) immiscibility and good adhesion strength in the solid state with the various thermoplastic polymers in question.

As it has been long known, many polymers belonging to the family of the completely aromatic polyesters display thermotropic liquid-crystalline characteristics, are generally endowed with a high thermal stability and are described in the technical literature and/or are claimed in a large number of patents.

Among the recent publications which describe the chemical structure, the characteristics and the applications of aromatic polyesters and of other thermotropic liquid-crystalline polymers, the following can be advantageously referred to:

(a) "Liquid Crystalline Aromatic Polyesters", by J. Economy, Journal of Macromolecular Science-Chemistry, vol. A21, pages 1705–1724 (1984);

(b) "Structure and Properties of Rigid and Semirigid Liquid Crystalline Polyesters", by G. Huynh-Ba and E. F. Cluff, Polymeric Liquid Crystals, A. Blumstein editor, Plenum Press (New York), pages 217–238 (1985);

(c) "The Recent Developments of Thermotropic Liquid Crystalline Polymers" by T. S. Chung, Polymer Engineering and Science, Vol. 26, pages 901–919 (1986);

(d) "The Structure of Thermotropic Copolyesters" by L. C. Sawyer and M. Jaffe, Journal of Material Science, Vol. 21, pages 1897–1913 (1986);

(e) "Properties of Liquid Crystal Injection Mouldings" by G. Menges. T. Schacht, H. Becker and S. Ott, International Polymer Processing, Vol. 2, pages 77–82 (1987).

Polymers representative of the class of the aromatic polyesters showing thermotropic liquid-crystalline properties are, e.g., the homopolymer of 4-hydroxybenzoic acid and its copolymers with other aromatic hydroxyacids, such as 3-hydroxy-benzoic acid, 6-hydroxy-2-naphthoic acid, 4-hydroxy-1-naphthoic acid, and still others.

Other known polymers belonging to the same class are copolyesters of 4-hydroxy-benzoic acid with various aromatic diols and aromatic bicarboxy acids, as well as a large number of copolyesters which can be derived from aromatic diols and aromatic bicarboxy acids.

Cited or claimed aromatic diols, used either as individual compounds or, more often, as various combinations with one another, are, in particular, 1,4-hydroquinone and 1,4-hydroquinones variously substituted on their aromatic ring, resorcinol, 4,4'-dihydroxybiphenyl and its derivatives substituted on their aromatic rings, 1,4-dihydroxy-naphthalene, 2,6- and 2,7-dihydroxynaphthalene, 4,4'-dihydroxydiphenylmethane, -ether, -sulfide, -sulfone, bisphenol A, and still others.

Cited or claimed aromatic bicarboxy acids, also used either as individual compounds, or, more often, as various mixtures with one another, are, in particular, terephthalic acid, isophthalic acid, biphenyl-4,4'-dicarboxy acid, naphthalene-2,6-dicarboxy acid, and still others.

Among the many patents which disclose and claim polymers belonging to the class of the thermotropic aromatic polyesters and copolyesters, the following can be regarded as being particularly interesting:

(a) U.S. Pat. Nos. 4,153,779; 4,241,496; 4,355,132; 4,355,133; 4,355,134; 4,429,105; 4,473,682; 4,536,562; 4,539,386; 4,562,244; 4,617,369;
(b) European patents EP 1340, 88742, 133024, 139303, 162667, 169947;
(c) World patent WO 8503712;
(d) German Federal Republic patents DE 3325703, 3325705, 3338623, 3427886, 3517270, 3517948;
(e) United Kingdom patent UK 2,161,171;
(f) French patent FR 2,576,027;
(g) Japanese patents JP 59-30821, 60-04528, 60-28428, 60-188423, 60-192724, 61-106622, 61-236819, 61-236826, 61-236827.

Many of the polymers belonging to the class of the thermotropic aromatic polyesters and copolyesters display characteristics complying with many of the above listed requisites of thermal stability, processability in the liquid-crystalline molten state, and suitability for application as self-reinforced thermoplastic polymers, and, some of them, as reinforcer materials for conventional thermoplastic polymers. Furthermore, within the scope of the claims published to date, only a very small number of polymers can be found, which are endowed with a whole of well-balanced characteristics, such as to render them simultaneously proposable both as self-reinforced thermoplastic materials, and as reinforcer agents for a wide range of conventional thermoplastic polymers.

The increase in thermal stability and the lowering of the melting point of the polymers belonging to the class in question are in fact two requisites generally in conflict with each other. Sufficient decreases in melting point are generally accomplished by renouncing to the completely aromatic character, by introducing in the polymeric chain aliphatic sequences or aliphatic atomic groups, which simultaneously decrease the thermal stability and/or the oxidation stability of the polymer, or, in case one wishes to preserve the completely aromatic character of the polymers, by introducing aromatic structural units which are capable of interrupting the linearity of the polymeric chain, but which also in a large number of cases destroy the liquid-crystallinity before sufficient reductions in melting point are obtained.

The object of the present invention is a family of completely aromatic thermotropic copolyesters having a thermal stability not lower that than 350° C., characterized by melting points comprised within the range of from about 200° to about 350° C., and furthermore characterized in that they originate a liquid-crystalline polymeric molten phase within the whole temperature range comprised between the melting point and the incipient thermal breakdown temperature.

A further object of the present invention is constituted by a family of completely aromatic thermotropic copolyesters additionally containing amidic bonding groups. Such copolyesters are characterized in that they have a thermal stability not lower than 350° C., and a melting point comprised within the range of from about 200° to about 350° C., and are furthermore characterized in that they originate a liquid-crystalline polymeric molten phase within the whole temperature range comprised between their melting point and their incipient thermal breakdown temperature.

As a consequence of the above said objects, a purpose of the present invention is also a family of completely aromatic thermotropic liquid-crystalline copolyesters optionally also containing bonding groups of amidic type, suitable for being used as self-reinforced thermoplastic polymers suitable for being processed in the molten state in order to yield a wide range of articles within a temperature range comprised between their melting point and their thermal breakdown temperature. Their processability in the molten state is understood herein as by means of fabrication processes, as well as by means of variants thereof, whose use is known in the field of the processes of fabrication of the traditional thermoplastic polymers, and of the traditional thermoplastic composites, i.e., in particular, by extrusion, injection-moulding, thermocompression moulding, melt-spinning, and still others.

A further purpose of the present invention is of providing completely aromatic thermotropic copolyesters, optionally containing also bonding groups of amidic nature, characterized in that they originate a polymeric molten phase of liquid-crystalline character stable within the melt-processing temperature range (of from about 200° up to about 350° C.) of a range of conventional thermoplastic polymers, in that they are processable in the molten state in mixture with them, and in that can act inside them as reinforcer agents. The thermoplastic polymers to which reference is made herein, are aliphatic polyamides, polyethylene-terephthalate, polybutyleneterephthalate, poly(bisphenol A-carbonate), polyethersulfones, and still others.

Still a further purpose of the present invention is of providing completely aromatic thermotropic copolyesters, optionally containing also bonding groups of amidic nature, which can be used as thermoplastic polymeric matrices for composite materials containing mineral filler of various types, fiberglass, carbon fibres, and still other fillers, and/or as thermoplastic polymeric materials in blends with pigments, dyes, and other known additives.

A further purpose of the present invention is of providing completely aromatic thermotropic copolyesters falling within the scope of the main claims of the instant invention, characterized in that they are endowed with characteristics of good solubility in various, known, conventional solvents, such as chlorinated solvents, N-methyl-pyrrolidone, N,N-dialkylamides of monocarboxy acids, dimethyl-sulfoxide, and still others, or mixtures thereof, and in that they are hence suitable for being prepared by means of methods of solution polymerization, besides methods of bulk polymerization in the molten state, as it is better evidenced in the following.

These, and still other, purposes, and the relevant advantages thereof can be better evidenced by the following disclosure in detail of the instant invention.

The completely aromatic copolyesters according to the present invention are constituted by a regular, or, more commonly, random, succession of repeating units selected from among one of the following units:

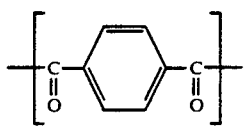

(I)

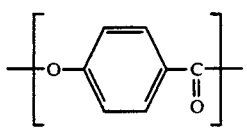

(II)

$+O-Ar-O+$ (III)

in which Ar is a suitable divalent aromatic group as disclosed in detail in the following; and containing

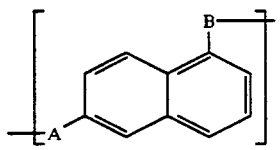

(IV)

wherein A and B, which can be either equal to, or different, from, each other, can be either —O— or —CO—.

The repeating unit (I) is a terephthaloyl unit and its contribution to the overall structure of the copolyesters according to the present invention, expressed as the percent molar fraction of the total moles of repeating units which constitute the polyester, can be comprised within the range of from 0 to 50%, and preferably of from 10% to 50%.

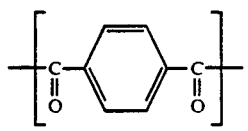

(I)

An increase in the percent content of terephthaloyl unit (I) in the structure tends to increase the melting point of the copolyesters in question.

The repeating unit (II) is a 4-oxybenzoyl unit and its molar fraction in the overall structure of the copolyesters in question can be comprised within the range of from 0 to 80%, and preferably of from 0% to 50%.

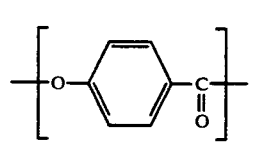

(II)

The repeating unit (III), which can be generally identified as a dioxyarylene unit $+O-Ar-O+$ (III)

comprises a divalent aromatic moiety Ar which can be selected from among 1,4-phenylene or ring-substituted 1,4-phenylene groups and which can be 2-alkyl-1,4-phenylene or 2-alkoxy-1,4-phenylene with an either linear or branched alkyl radical of from 1 to 5 carbon atoms, 2-chloro-1,4-phenylene, 2-bromo-1,4-phenylene, 2-phenyl-1,4-phenylene or 2-cyclopentyl-1,4-phenylene or 2-cyclohexyl-1,4-phenylene, 2-phenoxy-1,4-phenylene; Ar can also be, as an alternative, 4,4'-diphenylene.

The repeating dioxyarylene units preferably used within the scope of the instant finding are 1,4-dioxyphenylene, 1,4-dioxy-2-methyl-phenylene, 1,4-dioxy-2-phenyl-phenylene. According to the present invention, copolyesters can be furthermore prepared which contain repeating dioxyarylene units (III) belonging to one single type, e.g., 1,4-dioxyphenylene, or belonging to a plurality of simultaneously present types, such as, e.g., copolymers containing both 1,4-dioxyphenylene units and 1,4-dioxy-2-methyl-phenylene units, contained in amounts in variable ratios to one another.

The copolyesters according to the present invention contain a molar fraction of repeating dioxyarylene units (III), of one or more type(s) falling within the above listed types, which may vary within the range of from 0% to 50% of the total moles of repeating units contained in the copolymer chain.

The repeating unit (IV)

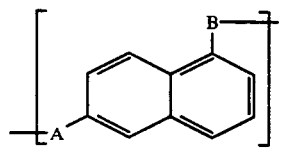

(IV)

can be selected from among 1,6-dioxy-naphthylene units if A=B=—O—, or 6-oxy-1-naphthoyl if A=—O— and B=—CO—, or 5-oxy-2-naphthoyl if A=—CO— and B=—O—, or still 1,6-naphthalenedioyl if A=B=—CO—. According to the present invention copolyesters can be prepared, which contain repeating units (IV) of one single type, or belonging to a plurality of simultaneously present types contained in amounts in variable ratios to one another.

The copolyesters according to the present invention contain a molar fraction of repeating units (IV), of one or more type(s) falling within the above listed types, which can be comprised within the range of from 10% to 25% of the total moles of repeating units contained in the copolymer chain.

Completely aromatic copolyesters containing, as bonding groups in the main chain of the polymer, besides the ester groups, also amidic groups, are a further object of the present invention.

In other terms, the present invention comprises copolyesters constituted by a regular sequence, or, more commonly, a random sequence, of suitable repeating units selected from among one from units (I), (IIa), (III), and containing the unit (IVa).

The terephthaloyl units (I) and the dioxyarylene units (III) have already being disclosed above, and the units (IIa) and (IVa) are the following extensions of the corresponding units (II) and (IV) as disclosed hereinabove for the copolyesters not containing amidic linkages:

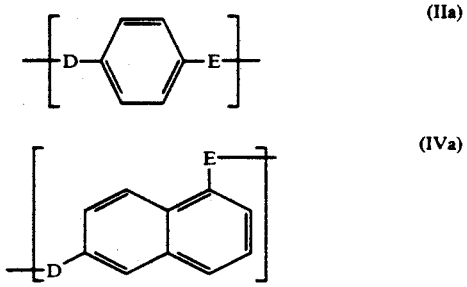

in which D and E, which can be either equal to, or different, from, each other, are —O—, —CO—, or —NH—.

The percent molar fraction of each individual repeating unit (I), (IIa), (III) and (IVa), relatively to the total moles of repeating units which constitute the copolyester, can be varied within the scope of the present invention within the same limits as hereinabove stated for the corresponding units (I), (II), (III) and (IV) which constitute the copolyesters not containing amidic linkages according to this same invention. A plurality of different types of each individual repeating unit (I), (IIa), (III) and (IVa) can be simultaneously present, in amounts in variable ratios to one another. The total content of amidic bonding groups in the copolyesters according to the present invention, expressed as their percent molar fraction relatively to the total moles of the bonding groups contained in the same copolyesters is preferably comprised within the range of from 0% to 20%.

In the copolyesters according to the present invention, the molar ratio of the repeating dicarboxy units to the dioxy units is always very close to 1.

In an analogous way, in the copolyesters containing amidic bonding groups, the molar ratio of the dicarboxy units to the total of the repeating dioxy units, diimino units and oxy-imino units is always practically 1 within the scope of the present invention. Said ratio of 1, as well known to those skilled in the art of polycondensations, is typical and necessary in the polycondensation polymers with high molecular weights.

The completely aromatic copolyesters, optionally containing amiding bonding groups, according to the present invention, are semi-crystalline solids which display melting points comprised within the range of from about 190° to about 350° C., and preferably comprised within the range of from about 200° to about 320° C.

Such melting point values can be determined, for each one of said materials, either as the temperature of the main endothermic peak contained in their thermograms, as obtainable by means of differential scanning calorimetry, or by direct observation under the optical polarizer microscope equipped with heating stage.

The melting points which can be determined by means of said two methodologies result to be, for each different sample, nearly coincident to each other, with a deviation contained within a temperature range not wider than about 5° C.

The copolyesters according to the present invention are generally rather well soluble at room temperature in such solvent blends as pentafluorophenol/hexafluoroisopropanol in the ratio of 50:50 by weight, or phenol/tetrachloroethane in the ratio of 60:40 by weight and, show, once dissolved in said solvents and at a concentration of 0.1 g/100 ml, values of inherent viscosity which are generally comprised within the range of from about 0.5 to about 4.5 dl/g, and are preferably comprised within the range of from 1.2 to 3.5 dl/g.

In particular, the values of inherent viscosity of the copolyesters prepared by polymerization in solution, as is better evidenced in the following, are comprised within the range of from about 0.5 to about 2 dl/g, and are preferably comprised within the range of from 0.7 to about 1.5 dl/g, with said inherent visosity values being determined on solutions of the same polymers in tetrachloroethane or in the solvent blend constituted by phenol/tetrachloroethane in the ratio of 60:40, at a concentration of 0.5 g/100 ml.

The copolyesters according to the instant invention display furthermore a high thermal stability, as determined by thermogravimetry, with temperatures of incipient thermal breakdown not lower than about 350° C. In general, the thermal degradation of such copolyesters begins to be appreciable only above 400° C.

The completely aromatic copolyesters optionally containing amidic bonding groups according to the present invention show a well visible anistrophy when they are caused to cross their own melting point. Said anistropy can be detected by observation at optical microscope equipped with heating stage, with crossed polarizers. In the molten state, said copolyesters retain characteristics of anisotropy, with no detectable alterations, throughout the temperature range comprised within their melting point and up to the temperature of thermal breakdown, behaving as viscous fluids.

The completely aromatic copolyesters according to the present invention can be prepared by means of the processes, known from the prior art, of bulk polymerization, with the only monomers and with the possible presence of catalysts, and in the absence of solvents and/or suspending media and the like, or also in solution, as well as in suspension in suitable suspending media, with each of said processes being possibly based on a variety of chemical reactions of esterification, well known as well.

Said processes and reactions are in particular known to those skilled in the art of the chemistry of polyesters, and especially of aromatic polyesters and copolysters.

The monomers which have to be used in order to form the various repeating units of the above defined types, and constituting the copolyesters according to the present invention, are different according to which one is the esterification reaction selected from among the known esterification reactions. i.e., said monomers have a structure corresponding to each one of the repeating units (I), (II), (III) and (IV), and are provided with the proper functional groups for the selected esterification reaction to take place. Such a reaction can take place between suitable pairs of functional groups the same monomers are provided with, such as, in particular, the functional pairs constituted by the carboxy group and the hydroxy group, the carboxy group and an ester group, an ester group and an ester group, an acyl halide group and a hydroxy group, and still others.

The completely aromatic copolyesters according to the present invention can be easily prepared preferably, but not exclusively, by means of known processes in which the esterification reaction takes place between the carboxy group and an acyl ester, i.e., a previously esterified hydroxy group.

The monomers suitable for use are:

(a) the bicarboxy acids with a structure corresponding to the structure of the repeating units (I) and (IV);

(b) the diacyl esters of the aromatic diols with a structure corresponding to the structure of the repeating units (III) and (IV), with the acylic residue of a suitably selected monocarboxy acid;

(c) the monoacyl esters of the hydroxyacids having a structure corresponding to the structure of the repeating units (II) and (IV), with the acyl residue of a suitable monocarboxy acid.

The reaction of polyesterification leads to the formation of the same monocarboxy acid which esterifies the hereinabove disclosed aromatic diols and hydroxyacids.

Said monocarboxy acid is distilled off from the reaction mixture as the reaction of polymerization proceeds, and therefore it should suitably show a high volatility at the temperatures adopted in the polymerization process. According to the present invention, said monocarboxy acid is preferably, but not exclusively, selected from the group consisting of the saturated monocarboxy acids with a number of carbon atoms comprised within the range of from 1 to 4 and, among these, acetic acid is preferably selected.

The preferably used monomers according to the instant invention are hence, in particular:

(a) terephthalic acid which, through the reaction of polyesterification, yields the formation of the repeating unit (I);

(b) 4-acetoxy-benzoic acid, which supplies the repeating unit (II);

(c) 1,4-diacetoxybenzene, the 1,4-diacetoxy-2-alkylbenzenes and 1,4-diacetoxy-2-alkoxy-benzenes with an alkyl group of from 1 to 5 carbon atoms, 1,4-diacetoxy-2-phenyl-benzene, 1,4-diacetoxy-2-cyclohexyl-benzene, 1,4-diacetoxy-2-cyclopentylbenzene, 1,4-diacetoxy-2-phenoxy-benzene, 1,4-diacetoxy-2-chloro-benzene, 1,4-diacetoxy-2-bromo-benzene, 4,4'-diacetoxy-diphenyl, which yield the repeating unit (III);

(d) 1,6-diacetoxy-naphthalene, 6-acetoxy-1-naphthoic acid, 5-acetoxy-2-naphthoic acid, naphthalene-1,6-dicarboxy acid, which supply the repeating unit (IV).

The completely aromatic copolyesters additionally containing amidic bonding groups, which are also an object of the present invention and are constituted by the hereinabove disclosed repeating units (I), (IIa), (III) and (IVa) can be prepared according to modalities similar to those as above disclosed for the preparation of the copolyesters without amidic groups.

The preparation of the copolyesters additionally containing bonding groups of amidic type additionally involves a reaction of amidation, which reaction is selected from the group of the reactions of amidation already known from the prior art, between suitable functional groups the suitable monomers are provided with, carried out in parallel to one of the esterification reactions, also belonging to the group of the reactions of esterification known from the prior art, as disclosed hereinabove.

Said copolyesters according to the present invention additionally containing amidic bonding groups are preferably, but not exclusively, prepared by means of known processes in which the reaction of esterification takes place between the carboxy group and an acyl ester and in which the amidation reaction takes place between the carboxy group and a mono-acylamide group, i.e., a previously mono-acylated aminic group.

Besides, or as an alternative to, the aromatic dicarboxy acids, the diacyl esters of the aromatic diols and the suitable acetoxy-carboxy acids as hereinabove stated, the monomers suitable for being preferably used for the preparation of the aromatic copolyesters containing amido-groups of the present invention are: the monoacetyl derivatives of the aromatic aminoacids, the symmetrical diacetyl derivatives of the aromatic diamines and the symmetrical diacetyl-derivatives of the aminophenols, each of which shall have a structure corresponding to each type of the possible repeating units (IIa) and (IVa).

Preferably used monomers of said type are, in particular, 1-acetoxy-4-acetamido-benzene, 4-acetamido-benzoic acid, 1,4-diacetamido-benzene.

According to a preferred process, the preparation of the completely aromatic copolyesters optionally containing amidic bonding groups according to the present invention is carried out by means of the bulk polymerization of the hereinabove disclosed monomers.

The reaction mass is constituted by the only necessary monomers or, preferably, by the same monomers and suitably selected catalysts.

The aromatic dicarboxy acids used as monomers are directly charged to the reaction vessel.

The acetic diesters of the aromatic diols, the acetic monoesters of the aromatic hydroxyacids, as well as the diacetyl-derivatives of the aromatic diamines, the diacetyl-derivatives of the aminophenols and the diacetyl-derivatives of the aromatic aminoacids, used as monomers in the instant invention, can be separately prepared and be subsequently charged to the polymerization vessel, or, preferably, they can be prepared prior to the same polymerization, inside said polymerization vessel, by means of the acetylation of the corresponding diols, hydroxyacids, diamines, aminophenols and aminoacids, with these latter being reacted with suitable acetylating agents.

According to the present invention, the preferred acetylating agent is acetic anhydride.

A polymerization process typically adopted within the scope of the present invention and described in greater detail in the examples reported in the following, consists of the following main steps:

(a) the total amounts of all of the necessary monomers, of the selected catalyst(s), as well as of the optionally necessary amount of acetic anhydride in case the preparation of the monomers by means of the acetylation of the relevant precursors in carried out in situ, are charged to a proper reaction vessel equipped with stirring means and with a vacuum seal;

(b) the possible reaction of acetylation is carried out at high temperature under refluxing conditions;

(c) the reaction mass gradually heated under a stream of an inert gas, such as nitrogen or argon, until the partial melting or the complete melting occurs of the ingredients charged to the reaction vessel and anyway until the same reaction mass turns into fluid, and up to a temperature generally close to 250° C., with the polymerization reaction, as well as the distillation of the acetic acid produced by the same reaction being started;

(d) the reaction mass is progressively heated, with stirring—with said reaction mass being kept stirred during the whole polymerization process—, up to a maximum operating temperature at least 20°-30° C. higher than the melting point of the polymer which is being prepared, and lower than the temperature of incipient degradation of the same polymer, with the reaction of polymerization being continued and the viscosity of the reaction mass progressively increasing;

(e) the same reaction mass is kept at said maximum temperature for a time period generally comprised within the range of from 0.5 to 2 hours, under a progressively decreasing pressure, and until a minimum pressure is reached, which is generally comprised within the range of from 1 to 0.01 torr. in order to further promote the distillation of acetic acid and the reaction of polymerization;

(f) the reaction mass is cooled down to a temperature close to room temperature, and the solid mass of produced copolyester is extracted, or the molten copolyester is discharged from the reaction vessel, as a filament, by extrusion from the bottom of a suitably equipped reaction vessel, then the filament of copolyester is cooled and granulated according to known processes.

The copolyester produced can be then submitted, in the solid state, to several known treatments such as, in particular:

(a) grinding, (b) washing with various organic solvents and/or water in order to remove from it any unreacted components, catalysts, impurities, and any other foreign matter;

(c) drying, (d) accelerated ageing at suitable temperatures under a blanketing atmosphere constituted by an inert gas such as nitrogen, argon, carbon dioxide and still others, or in the air, in order that further increases are achieved in the molecular weight of the same polymer.

Suitable catalyst for use for such a process of polymerization in bulk are those selected from among the known catalysts of the condensation reactions and, in particular, of the transesterification reactions, such as anhydrous halogen halides, Lewis' acids, such as boron halides and their complexes, or oxides, hydroxides, hydrides, halides, alkoxides, phenoxides; salts with carboxy acids and acetylacetonates of metals and semimetals; alkoxy-metal and alkyl-metal and aryl-metal oxides and salts; and still others, or mixtures thereof.

The acetates of lithium, sodium, potassium, calcium, magnesium, zinc, manganese, cobalt, ferrous acetate, calcium benzoate, magnesium acetylacetonate and zinc acetylacetonate, titanium and zirconium tetraisopropoxides, titanium and zirconium tetrabutoxides, sodium and potassium phenoxides, alkoxytitanium silicates, antimony sesquioxide, germanium dioxide, dibutyl-tin oxide, dibutyl-dimethoxy-tin, dibutyl-tin diacetate, and the like, are particularly suitable.

Said catalysts can be used either alone or as mixtures with one another.

The preferable total amount of such catalysts in the reaction mass is typically variable within the range of from 0.001 to 1% by weight relatively to the total weight of the monomers, and is preferably comprised within the range of from 0.01 to 0.2%.

The completely aromatic copolyesters according to the present invention are also prepared by means of processes of solution polymerization selected from among the known solution polymerization processes, in which the preferably adopted chemical reaction of polyesterification is the reaction which takes place between the acyl chloride group and the hydroxy group as such, which groups are the functional groups the monomers are provided with, with each of said monomers having a structure corresponding to the hereinabove disclosed repeating units (I), (II), (III) and (IV). The completely aromatic copolyesters additionally containing amidic bonding groups, which also constitute an object of the present invention, are also prepared by means of processes of solution polymerization analogous to those as disclosed hereinabove, in which the preferably adopted chemical reaction of esterification is the reaction which takes place between the acyl chloride group and the hydroxy group, and the preferably adopted chemical reaction of amidation is the reaction which takes place between the acyl chloride group and the primary aminogroup, with this latter functional group, in particular, being borne by the monomers having a structure corresponding to the structure of the repeating units (IIa) and (IVa) as above disclosed.

The monomers suitable for being used according to said solution polymerization processes are terephthaloyl chloride, 1,6-naphthalenedioyl chloride, as well as the aromatic diols, the aromatic diamines and the aminophenols with a structure corresponding to the repeating units (IIa), (III) and (IVa).

The polymerization with said monomers is preferably carried out, according to the present invention, in known solvents, or in known solvent mixtures preferably, but not limitedly, selected from the group consisting of the chlorinated derivatives of the hydrocarbons belonging to the classes of the alkanes, alkenes, cycloalkanes, aromatic hydrocarbons and mixed hydrocarbons, such as, in particular, dichloromethane, trichloroethylene, 1,1,1-trichloropropane, perchloroethylene, tetrachloroethane, chlorobenzene, alpha-chloro-naphthalene, and still others.

Other suitable solvents, which can be used either alone or in mixture with the preceding solvents and/or with still other solvents, are selected from the known group of the polar aprotic solvents, such as, in particular, N,N-dimethylformamide, N,N-dimethylacetamide, N-methyl-pyrrolidone, dimethyl-sulfoxide, tetramethylurea, and still others.

The reaction of solution polymerization, carried out with the suitable monomers for it as hereinabove listed, generates, as known, hydrogen chloride, and said reaction is preferably carried out according to the present invention in the presence of a suitable reactant, having the chemical characteristics of a base, which acts as an acceptor of hydrogen chloride by means of a reaction of salification.

Such a reactant is added to the polymerization medium in an amount stoichiometrically equivalent to, or preferably higher than, the expected theoretical amount of hydrogen chloride generated by the polymerization. Said suitable reactant is comprised among the known types, and is preferably selected, according to the instant invention, from the group consisting of the tertiary amines or polyamines. In particular, said hydrogenchloride-acceptor reactant is preferably, but not limitedly, constituted by trimethylamine, triethylamine, tripropylamine, tributylamine, pyridine, picoline, quinoline, dimethyl-cyclohexylamine, diethylcyclohexylamine, methyl-diisopropyl-amine, ethyldiisopropylamine, cyclohexyl-diisopropylamine, and still other tertiary amines, or mixtures thereof.

The completely aromatic copolyesters, optionally containing amidic bonding groups, can be prepared by means of a technique of polymerization in solution by using the hereinabove disclosed monomers and reactants, by means of a process which preferably, and typically, comprises, according to the presnet invention, the following main steps, better disclosed in the Examples reported later on:

(a) charging and dissolution of the monomers—excluding the acyl dichlorides—of the hydrogen chloride—acceptor aminic reactant and of the solvent(s), to a reactor equipped with stirring means and inlet tube for feeding an inert gas, such as dry nitrogen or argon;

(b) a solution of the acyl dichloride(s) dissolved in a suitable solvent is slowly charged to the reaction vessel, with the stirring means being kept operating throughout the process, and with the temperature of the solution inside the reaction vessel being kept at values generally comprised within the range of from 0° to 35° C.;

(c) the reaction mixture is kept stirred at a temperature comprised within the range of from 0° to 35° C. for a time comprised within the range of from 8 to about 48 hours;

(d) the copolyester is precipitated in a suitable volume of a liquid acting as a precipitant for the same polymer, such as acetone, methanol, isopropanol and the like;

(e) the copolyester powder is filtered off and is washed with several solvents and with water;

(f) the copolyester is dried.

The so-prepared copolyesters can then be submitted to post-treatments similar to those as hereinabove set forth for the polymers according to the present invention obtained by bulk polymerization.

The characteristics and the processes of preparation of the completely aromatic copolyesters according to the present invention are better evidenced by the following examples of practical embodiment, which examples are reported for merely indicative, non-limitative purposes within the scope of protection of the same invention.

Example No. 1

The following reactants are charged to a cylindrical glass reaction vessel with spherical bottom, provided with a flange cover with a tight vacuum sealing, with three necks respectively bearing a fitting for connection with an inert gas feed pipe, a distillation/refluxing head and an anchor stirrer with an anchor made from AISI 316 stainless steel propelled by a high-power electrical motor:
  49.84 g of terephthalic acid (0.30 mol)
  16.52 g of hydroquinone (0.15 mol)
  24.03 g of 1,6-dihydroxynaphthalene (0.15 mol)
  0.048 g of manganese acetate tetrahydrate
  71.46 g of acetic anhydride (0.70 mol).

The contents of the reaction vessel are kept at 145°-150° C., with the reaction vessel being kept dipped in a molten-salts bath (a mixture of 40% of sodium nitrite, 7% of sodium nitrate and 53% of potassium nitrate), in order to cause hydroquinone and 1,6-dihydroxynahthalene to undergo acetylation. About one hour later, the temperature of the bath is gradually increased up to 250° C., with strong stirring and under a slow stream of dry argon. During this step the excess of acetic anhydride and the acetic acid produced during the reaction of acetylation are distilled off. The system is maintained at 250° C. for about 1 hour. During the course of the subsequent hour, the temperature is then increased up to 300° C., and is kept constant at this value for about 2 hours, still under a dry argon stream. During this step, most of the acetic acid produced during the polycondensation is distilled off, and the viscosity of the reaction mass undergoes a gradual increase.

The temperature is then slowly increased, during the course of a further hour, up to 340°-350° C.

When this latter temperature is reached and stabilized, the argon stream is discontinued and the pressure is progressively decreased down to a minimum value of 0.1 torr during the course of a further hour, during which a further increase in viscosity takes place. The acetic acid, a small amount of which is distilled off during such a reduced-pressure step, is condensed inside a large-size test tube dipped in liquid nitrogen. The reaction vessel is removed out from the molten-salts bath and is allowed to cool in air until it reaches room temperature. The solid copolyester mass is broken and ground inside a blade mill cooled with liquid nitrogen. The finely granular product is hot-washed with successive portions of acetone, water and acetone, and is dried several hours under vacuum at about 70° C.

An amount of 82 g of copolyester is obtained, which corresponds to a yield of about 92% of theoretical yield.

The resulting copolyester has an inherent viscosity of about 1.5 dl/g in solution in a 50:50 mixture by weight of pentafluorophenol and hexafluoroisopropanol, at the concentration of 0.1 g/100 ml and at the temperature of 30° C.

The copolyester shows a melting point of about 303° C., as determined by differential scanning calorimetry—as an exotherm peak on the thermograms—, and by means of the observation under the polarizer optical microscope with heating stage and crossed Nicol prisms.

The molten phase of the copolyester displays the typical anisotropy of the thermotropic polymers, a feature which is retained by it until it undergoes thermal breakdown.

The process of thermal breakdown of the copolyester, as determined by thermogravimetry, shows that the degradation of the polymer begins at temperatures not lower than 370° C., with the degradation rate becoming appreciable only at temperatures exceeding 400° C.

Example No. 2

The following reactants are charged to a reaction vessel similar to the reaction vessel disclosed in Example 1:
  49.84 g of terephthalic acid (0.30 mol)
  31.22 g of 1,4-diacetoxy-2-methyl-benzene (0.15 mol)
  32.62 g of 1,6-diacetoxynaphthalene (0.15 mol)
  0.030 g of sodium acetate anhydrous A polymerization process analogous to the process as disclosed in Example 1 is followed, with, as compared to this latter, the initial step of acetylation of the aromatic diols being obviously omitted. The various steps of the process are, for the remainder, corresponding to those of Example 1, except for the adopted temperatures: heating up to 240° C., stay at 240° C. for one hour, heating during a 1-hour time up to 260° C., stay at 260° C. for 2 hours, heating up to 300° C. within a 1-hour time, during which time an increasing vacuum is applied, until an end pressure of 0.1 torr is reached, like in the former example. After being cooled down to room temperature, the copolyester is ground, washed and dried in the same way as in Example 1.

An amount of 87 g of copolyester is obtained, which corresponds to a yield of about 95% of theoretical yield.

The resulting polymer has an inherent viscosity of about 1.7 dl/g in solution at the concentration of 0.1% (g/100 ml) is a 60:40 mixture by weight of phenol and tetrachloroethane, and at the temperature of 25° C.

The melting point of the copolyester is of about 260° C.

Also the copolyester according to the instant example yield a molten phase endowed with anisotropic characteristics within the temperature range up to its temperature of incipient thermal breakdown, which is of about 400° C. according to the thermogravimetric determinations.

Example No. 3

The following reactants are charged to a reaction vessel similar to the reaction vessel as disclosed in Example 1:

49.84 g of terephthalic acid (0.30 mol)
27.93 g of phenyl-hydroquinone (0.15 mol)
24.03 g of 1,6-dihydroxynaphthalene (0.15 mol)
0.055 g of sodium acetate anhydrous
71.46 g of acetic anhydride (0.70 mol).

An acetylation and polymerization process at all analogous to the process as disclosed in Example 1 is followed, with dry nitrogen being used as the inert blanketing gas during the whole process.

The various steps of the process are as follows: acetylation at 145°–150° C. as already set forth in Example 1, temperature increase up to 240° C. during a 1-hour time, stay of the reaction mass at 240° C. for two hours, further temperature increase up to 260° C. during a 1-hour time, and then up to 280° C. within a further 1-hour time, stay at 280° C. for a further hour under an increasing vacuum, with applied vacuum reaching an end value of 0.2 torr.

The polymer is cooled down to room temperature, is ground under liquid nitrogen, is washed and dried in the same way as in Example 1.

An amount of 90 g of copolyester is obtained, which corresponds to a yield of about 90% of theoretical yield.

The inherent viscosity of the copolyester, determined at 25° C. in solution at 0.1% in a 60:40 mixture by weight of phenol and tetrachloroethane, is of about 1.2 dl/g. By means of differential scanning calorimetry and optical microscopy a melting temperature of about 210° C. is determined for the copolyester. Beyond this temperature, the molten phase of the polymer displays anisotropic characteristics, and flowing ability as a high-viscosity fluid, which characteristics are retained by it up to a temperature not lower than about 390° C. Above this temperature, the thermal breakdown of the material starts, according to as determined by thermogravimetry.

Example No. 4

The copolyester of Example 2 is prepared by means of a process of polymerization is solution according to the method as disclosed hereinunder.

The following reactants are charged to a cylindrical glass reaction vessel of 1 liter of capacity with three necks respectively bearing a blade stirrer, an inlet funnel and a fitting for dry nitrogen feed:

7.208 g of 1,6-dihydroxynaphthalene (45.0 mmol)
5.586 g of methyl-hydroquinone (45.0 mmol)
27.3 g of triethylamine (270 mmol)
300 ml of tetrachloroethane.

When all of the above have gone into solution, to this latter a solution constituted by:

18,270 g of terephthaloyl chloride (90.0 mmol)
100 ml of tetrachloroethane is added dropwise during a time of about 90 minutes.

The resulting reaction mixture is kept stirred about 40 hours at room temperature under a slow stream of dry nitrogen.

The copolyester is then precipitated by dilution in about 1 liter of acetone, is recovered by filtration and is washed with further acetone, water and further acetone, and is finally vacuum-dried at about 70° C.

23.4 g of polymer is obtained, which corresponds to a yield about equivalent to 96% of theoretical yield.

The obtained copolyester has an inherent viscosity of about 0.95 dl/g in solution at 0.5% by weight (g/100 ml) in tetrachloroethane at 25° C. Its behaviour as a function of temperature is analogous to that of the polymer of Example 2.

Example No. 5

The copolyester of Example 3 is also prepared by means of a process of polymerization is solution according to the method as disclosed in Example 4, but with the following reactants being used:

7.208 g of 1,6-dihydroxynaphthalene (45.0 mmol)
8.380 g of phenyl-hydroquinone (45.0 mmol)
27.3 g of triethylamine (270 mmol)
18.270 g of terephthaloyl chloride (90.0 mmol)
400 ml of tetrachloroethane.

The copolyester is isolated and purified in the same way as disclosed in Example 4.

24.0 g of polymer is obtained, which corresponds to a yield of about 88%, with an inherent viscosity of about 0.85 dl/g in solution at 0.5% by weight in tetrachloroethane at 25° C.

The thermal characteristics of the copolyester are analogous to those of the polymer obtained in Example 3.

Example 6

A completely aromatic copolyester additionally containing bonding amido groups is prepared by means of a solution polymerization process according to the method disclosed in the following.

To the reaction vessel, similar to, and equipped like, the reaction vessel as disclosed in Example 4, the following reactants are charged:

5.766 g of 1,6-dihydroxynaphthalene (36.0 mmol)
6.704 g of phenyl-hydroquinone (36.0 mmol)
24.3 g of triethylamine (240 mmol)
240 ml of tetrachloroethane.

When all of the above has gone into solution, to this latter a solution constituted by:

18,270 g of terephthaloyl chloride (90.0 mmol)

100 ml of tetrachloroethane is added dropwise during a time of about 90 minutes.

The mixture is kept stirred about 2 hours at room temperature under a slow stream of dry nitrogen, and then during about 2 hours a cold solution is added dropwise, which is constituted by:

1.964 g of 4-amino-phenol (18.0 mmol)
3.0 g of triethylamine (30.0 mmol)
60 ml of tetrachloroethane.

The mixture is kept stirred under an atmosphere of dry nitrogen for a further 36 hours at room temperature. From the resulting cloudy solution, the polymer is then precipitated and is subsequently washed and dried, as in Example 4.

23.2 g of copolyester is obtained, which corresponds to a yield about equivalent to 89% of theoretical yield.

The inherent viscosity of the polymer, measured on a solution at 0.5% in pentafluorophenol at 60° C., is of 0.85-0.95 dl/g.

At temperatures higher than about 210° C., the copolyester gives an anisotropic molten phase which under a nitrogen blanketing atmosphere begins to decompose by thermal breakdown above 380° C.

We claim:

1. A completely aromatic thermotropic liquid-crystalline copolyester having a thermal stability not lower than 350° C., a melting point ranging from about 200° to about 350° C. and capable of originating a liquid-crystalline polymeric molten phase within the entire temperature range between the melting point and the temperature at which thermal degradation begins, said copolyester comprising repeating units selected from the group consisting of:

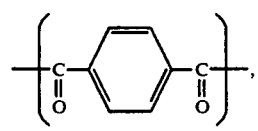

(I)

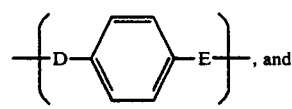

(II)

(III)

wherein D and E, which can be the same or different, are independently selected from —O—, —CO—, or —NH—; and Ar is a divalent aromatic residue; and further comprising units of the general formula:

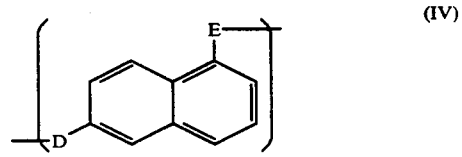

(IV)

wherein D and E are as defined above, with the proviso that said polyester comprises at least one sequence of units (IV) and (II) wherein at least one of said D or E groups is —NH—.

2. A copolyester as defined in claim 1 wherein said copolyester further comprises a sequence of units (IV) and (II) wherein no —NH— units are present.

3. A copolyester as defined in claim 1 wherein the total content of bonding amido groups, expressed as the molar fraction of bonding amido groups to the total moles of bonding groups, is less than or equal to 20%.

* * * * *